No. 626,357. Patented June 6, 1899.
C. WHITNEY.
PHOTOGRAPHIC FILM ROLL.
(Application filed Oct. 31, 1898.)
(No Model.)
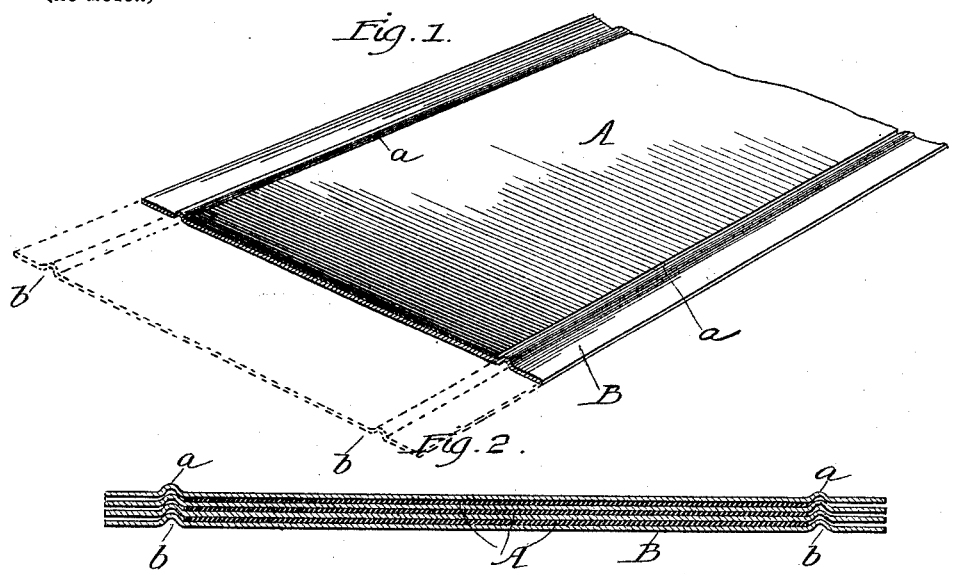
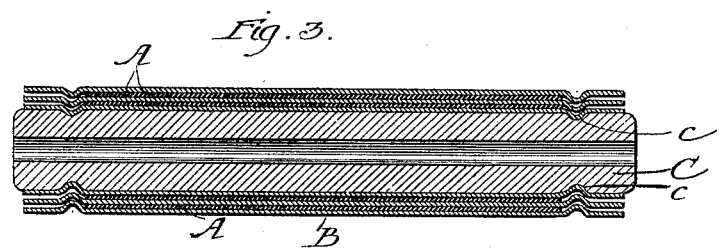
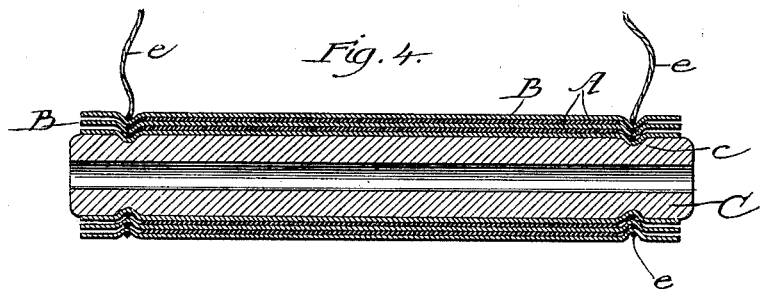
Witnesses:
Frank S. Blanchard
M. J. Friel.
Inventor:
Charles Whitney
By Attorney
Frank D. Thomason

UNITED STATES PATENT OFFICE.

CHARLES WHITNEY, OF WINNETKA, ILLINOIS.

PHOTOGRAPHIC-FILM ROLL.

SPECIFICATION forming part of Letters Patent No. 626,357, dated June 6, 1899.

Application filed October 31, 1898. Serial No. 695,083. (No model.)

*To all whom it may concern:*

Be it known that I, CHARLES WHITNEY, a citizen of the United States, and a resident of Winnetka, in the county of Cook and State of Illinois, have invented certain new and useful Improvements in Light-Proof Wrappers for Photographic Negative-Films, of which the following is a full, clear, and exact description.

The object of my invention is to provide a simple and effective means for excluding the light from sensitive photographic films, and particularly those rolls of flexible films used in magazine-cameras. This I accomplish by an opaque flexible wrapper of suitable material, constructed and used as hereinafter fully described and as particularly pointed out in the claims.

In the drawings, Figure 1 is a perspective view of an open strip of the wrapper, showing the position of the sensitive film placed thereon. Fig. 2 is a transverse section through several layers of wrapper and film. Fig. 3 is a longitudinal section through a spool or winding-post having the film and wrapper wound thereon. Fig. 4 is a sectional view similar to Fig. 3, showing the spool and wrapper as provided with a cord to more effectually exclude light.

In the drawings, A represents a sheet of sensitive photographic film, which may be of any dimensions desired, but which I prefer to make of such width as to adapt it for use in a given-sized camera and of such length that a given number of exposures can be made consecutively thereon. B represents a wrapper of opaque material, preferably paper, which is of a width exceeding that of said film, so as to leave a longitudinal conterminous marginal area on each side of the film A when the latter is properly placed on said wrapper. Each of these marginal areas of the wrapper is provided with a longitudinal ridge $a$, which is made by making a longitudinal groove $b$ in one side of the material of which the wrapper is made and pushing or bulging out the material on the other side to form the ridge. The result of this construction is such that when the wrappers are placed one upon the other, so that their side edges are bounded by the same planes, the grooves $b$ on one side of the wrapper form channels, into which the ridges of the next layer enter. The more usual manner of utilizing sensitive film is in a roll, and in order to practically apply the films in this form to cameras a cylindrical spool or winding-post C is used.

When winding a sensitive film enveloped in my improved wrapper upon a spool, I place the film upon the same upon the spool, with the ridges $a$ $a$ facing the spool. In order to permit this, I provide the spool with two circumferential grooves $c$ $c$, which are so located that the innermost evolution of the ridge of the wrapper enters the same, and the ridges of each successive evolution of wrapper enter the groove of the evolute thereof, which it envelops and thoroughly excludes the light which might otherwise find entrance between the edges of each layer and affect the film lying between the same. As the wrapper is preferably considerably longer than the film, it can be wound two or three times around the spool after the film is all wound up, and thus effectually exclude the light in all directions.

If desired, I can effectually use a thin cord or thread $e$ in connection with my invention in order to more effectually insure the exclusion of the light from the film. When this cord is used, its inner bight is placed in the groove $b$ of the innermost envelop of the wrapper and is then wound around the spool or winding-post, always remaining in the groove, but drawn tight, so as to make the successive evolutes enveloped thereby, and then the ends of the cord or string, which are sufficiently extended beyond the ends of the wrapper, are suitably tied around the completed roll.

I do not desire to be confined to the use of a wrapper having its ridges projecting toward the spool or winding-post, because an unbroken cylindrical spool can be employed, if desired, and the wrapper be wound upon it so that its ridges will face outward. I do not, moreover, care what shape be given the ridge, although I prefer that shown in the drawings, the sides of which are inclined toward each other and meet to form the apex; but any shaped ridge which will permit the ridge of one layer of wrapper to enter the groove formed by the obverse of the ridge of the other layer to exclude the light in the manner described will answer the purposes of my invention.

What I claim as new is—

1. A wrapper for photographic sensitive films consisting of a strip of opaque material of suitable dimensions having longitudinal ridges projecting from one surface and corresponding grooves in its opposite surface into which the ridges of the next adjacent wrapper enter.

2. A wrapper for photographic sensitive films consisting of a strip of opaque flexible material of suitable dimensions having longitudinal grooves formed in one surface at or near each side edge and resultant ridges projecting from the opposite surface thereof.

3. A wrapper for photographic sensitive films consisting of a strip of opaque flexible material of suitable dimensions having longitudinal grooves formed in one surface at or near each side edge and corresponding companion ridges projecting from the opposite surface, in combination with a cylindrical winding-post or spool having circumferential grooves therein into which the ridges of said wrapper enter when the latter is wound thereon.

4. A wrapper for photographic sensitive film, consisting of a strip of opaque flexible material of suitable dimensions having longitudinal grooves formed in one surface near each side edge, and corresponding companion ridges projecting from the opposite surface in combination with binding cords or strings placed in said wrapper, as and for the purpose set forth.

5. A wrapper for photographic sensitive film consisting of a strip of opaque flexible material of suitable dimensions having longitudinal grooves formed in one surface near each side edge thereof, and corresponding companion ridges projecting from the opposite surface, in combination with a cylindrical winding-post or spool having circumferential grooves into which the ridges of said wrapper enter when the latter is wound thereon, and binding strings or cords placed in said grooves and wound around said wrapper, as and for the purpose set forth.

CHARLES WHITNEY.

Witnesses:
C. K. CLAUER,
FRANK D. THOMASON.